US012578601B2

(12) United States Patent
Ota et al.

(10) Patent No.: US 12,578,601 B2
(45) Date of Patent: Mar. 17, 2026

(54) BACKLIGHT AND DISPLAY DEVICE

(71) Applicant: Magnolia White Corporation, Tokyo (JP)

(72) Inventors: Takashi Ota, Tokyo (JP); Nobuyuki Suzuki, Tokyo (JP); Masafumi Okada, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 19/044,880

(22) Filed: Feb. 4, 2025

(65) Prior Publication Data

US 2025/0264761 A1    Aug. 21, 2025

(30) Foreign Application Priority Data

Feb. 16, 2024    (JP) ................................. 2024-021935

(51) Int. Cl.
G02F 1/1335 (2006.01)
(52) U.S. Cl.
CPC .............................. G02F 1/133607 (2021.01)
(58) Field of Classification Search
CPC ................................... G02F 1/133602–133614
See application file for complete search history.

(56) References Cited

U.S. PATENT DOCUMENTS

| | | | | |
|---|---|---|---|---|
| 11,098,856 B2 * | 8/2021 | Hanslip | ................ | G02B 5/0205 |
| 2013/0148036 A1 | 6/2013 | Shimizu | | |

FOREIGN PATENT DOCUMENTS

| | | | | | |
|---|---|---|---|---|---|
| CN | 113917579 A | * | 1/2022 | ........ | G02F 1/133611 |
| JP | 2018-056367 A | | 4/2018 | | |

* cited by examiner

*Primary Examiner* — Jason M Han
(74) *Attorney, Agent, or Firm* — K&L Gates LLP

(57) ABSTRACT

A backlight includes: light sources planarly arranged and each capable of emitting divergent light; first lenses planarly arranged, overlapping with the respective light sources from above, and being of a shape enabling reduction of a divergence angle of the divergent light; second lenses planarly arranged, overlapping with the first lenses from above, and being of a shape enabling further reduction of the divergence angle; and a partition wall located between the first lenses and the second lenses, surrounding each of the first lenses, blocking part of the divergent light, and reducing an illumination area of the divergent light directed toward each of the second lenses.

17 Claims, 7 Drawing Sheets

BACKLIGHT AND DISPLAY DEVICE

CROSS-REFERENCE TO RELATED APPLICATION

The present application claims priority from Japanese patent application JP2024-021935 filed on Feb. 16, 2024, the contents of which are hereby incorporated by reference into this application.

BACKGROUND

1. Field

This disclosure relates to a backlight and a display device.

2. Description of the Related Art

A backlight in which multiple point light sources are planarly arranged is used to achieve a surface light source (WO2012/029600, JP2018-56367A). Ideally, the backlight should emit collimated light; however, since light from the point light sources is diffusive, multiple lenses are required.

If the irradiation range of each point light source is circular, adjacent irradiation ranges partially overlap. As a result, light enters neighboring lenses, making it difficult to achieve collimated light. It should be noted that WO2012/029600 and JP2018-56367A aim to reduce luminance unevenness and do not consider the emission of collimated light.

SUMMARY

This disclosure aims to enable the emission of collimated light.

A backlight includes: light sources planarly arranged and each capable of emitting divergent light; first lenses planarly arranged, overlapping with the respective light sources from above, and being of a shape enabling reduction of a divergence angle of the divergent light; second lenses planarly arranged, overlapping with the first lenses from above, and being of a shape enabling further reduction of the divergence angle; and a partition wall located between the first lenses and the second lenses, surrounding each of the first lenses, blocking part of the divergent light, and reducing an illumination area of the divergent light directed toward each of the second lenses.

A display device includes: the backlight, and a transmissive display panel.

DETAILED DESCRIPTION

Figure 1:
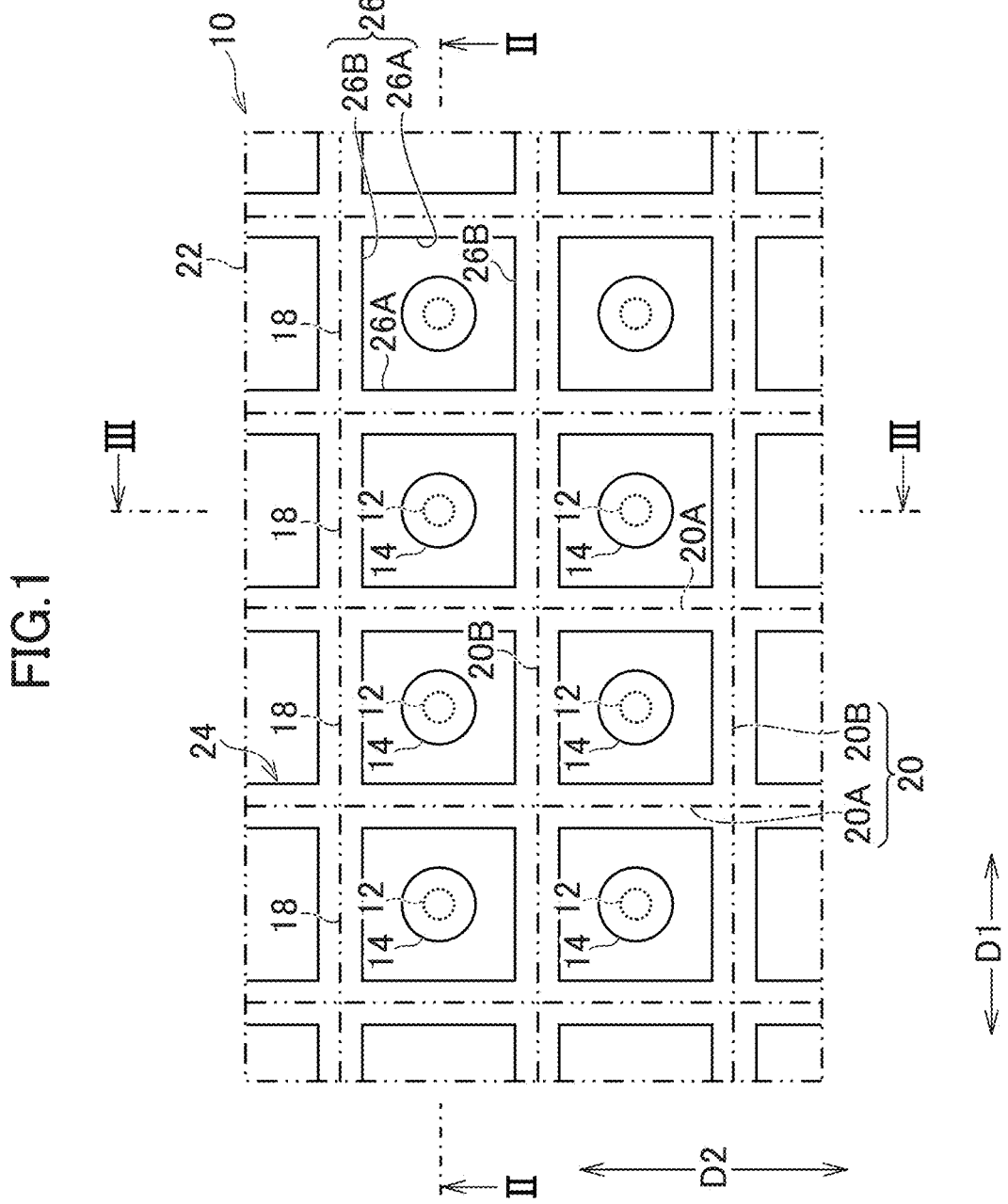
FIG. 1 is a partial plan view of a backlight according to an embodiment.

Hereinafter, some embodiments will be described with reference to the drawings. Here, the invention can be embodied according to various aspects within the scope of the invention without departing from the gist of the invention and is not construed as being limited to the content described in the embodiments exemplified below.

The drawings are further schematically illustrated in widths, thickness, shapes, and the like of units than actual forms to further clarify description in some cases but are merely examples and do not limit interpretation of the invention. In the present specification and the drawings, the same reference numerals are given to elements having the same functions described in the previously described drawings, and the repeated description will be omitted.

Further, in the detailed description, "on" or "under" in definition of positional relations of certain constituents, and other constituents includes not only a case in which a constituent is located just on or just under a certain constituent but also a case in which another constituent is interposed between constituents unless otherwise mentioned.

Figure 2:
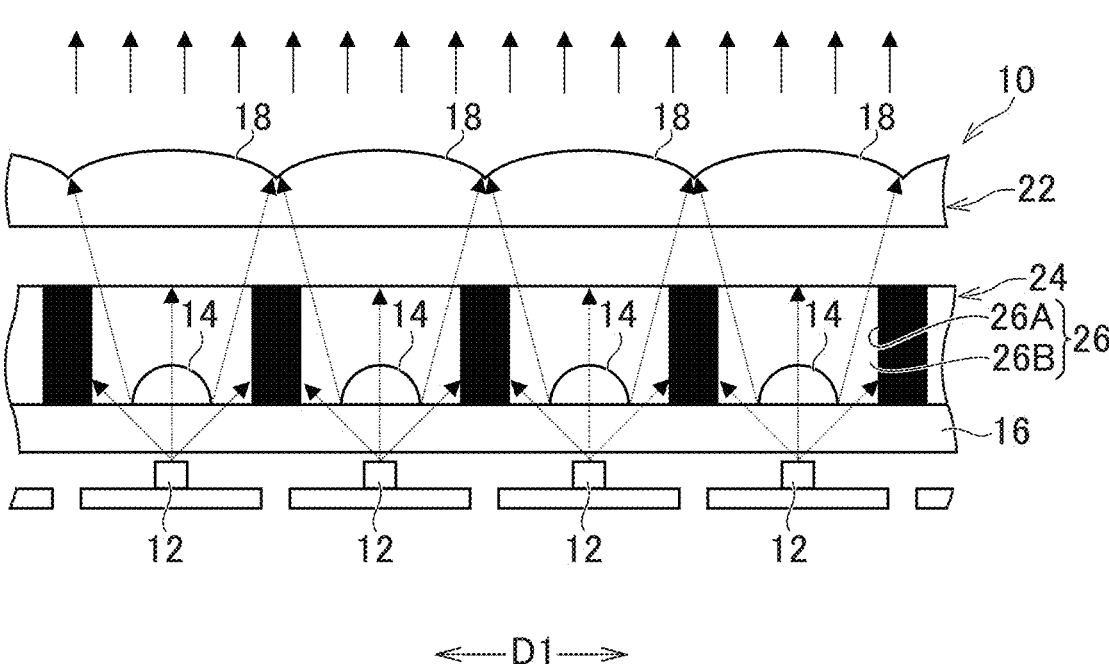
FIG. 2 is a sectional view taken along line II-II of the backlight in FIG. 1.
Figure 3:
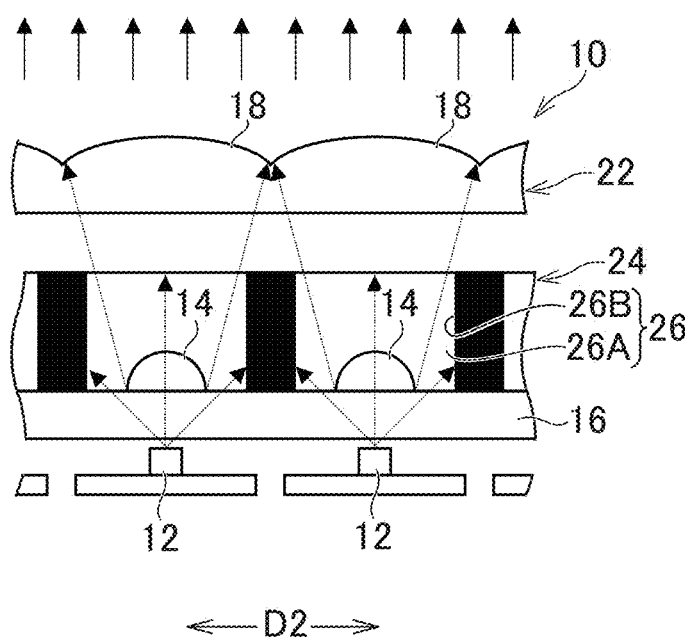
FIG. 3 is a sectional view taken along line III-III of the backlight in FIG. 1.

FIG. 1 is a partial plan view of a backlight according to an embodiment. FIG. 2 is a sectional view of the backlight in FIG. 1 taken along line II-II. FIG. 3 is a sectional view of the backlight in FIG. 1 taken along line III-III.

The backlight 10 includes a light source 12 (e.g., light-emitting diode). Light sources 12 are planarly arranged (e.g., in rows and columns). The light sources 12 are oriented in the same direction. The light source 12 can emit divergent light.

The divergent light (e.g., white light) spreads from an optical axis in a first direction D1 and a second direction D2, which are perpendicular to each other. The light distribution angle is, for example, ±90 degrees. The light source 12 functions as a point light source.

The backlight 10 includes a first lens 14. First lenses 14 are planarly arranged (e.g., in rows and columns). The first lenses 14 overlap with the respective light sources 12 from above. The first lens 14 is a spherical lens and is a convex lens that protrudes on the side opposite to the light source 12. The first lens 14 is of a shape enabling reduction of the divergence angle of the divergent light emitted from the light source 12. The light distribution angle is, for example, ±15 degrees.

The first lens 14 is of a planar shape forming a circle. The first lenses 14 are spaced apart from each other. The spacing between an adjacent pair of the first lenses 14 is wider in a direction intersecting both the first direction D1 and the second direction D2 than in either of those directions. The illumination area 28A (see FIG. 4) from the light source 12 (divergent light) on the first lens 14 is circular.

The first lenses 14 are supported by a transparent substrate 16. For example, the front and rear surfaces of the transparent substrate 16 are flat, and the first lenses 14 are positioned on one of the front and rear surfaces. The first lenses 14 and the transparent substrate 16 may be separately formed and adhered or may be integrated. The divergent light from the light source 12 passes through the transparent substrate 16 and enters each first lens 14, exiting the transparent substrate 16 outside each first lens 14.

The backlight 10 includes second lenses 18. The second lenses 18 are planarly arranged (e.g., in rows and columns). The second lenses 18 overlap with the respective first lenses 14 from above. The second lens 18 is a spherical lens and is a convex lens that protrudes on the side opposite to the light source 12. The second lens 18 is of a shape enabling further reduction of the divergence angle of the divergent light. The light emitted from the second lens 18 is substantially collimated light with a light distribution angle of, for example, ±1.5 degrees or less.

The second lenses 18 are contiguous to each other. As shown in FIG. 1, the second lens 18 is of a planar shape forming a rectangle (e.g., square). Edges 20 of the rectangle include a pair of first edges 20A facing the first direction D1 and a pair of second edges 20B facing the second direction D2. An adjacent pair of the second lenses 18 are contiguous along the edge 20 of the rectangle. The second lenses 18 are integrated to form a lens array 22, which includes second lenses 18 on one surface and a flat surface on another surface.

The backlight 10 includes a partition wall 24. The partition wall 24 is positioned between the first lenses 14 and the second lenses 18 (lens array 22). The partition wall 24 is fixed to the transparent substrate 16. There is a space between the partition wall 24 and the lens array 22 (second lenses 18). Thus, the backlight 10 is less likely to appear dark due to the shadow of the partition wall 24 when viewed from the light-emitting surface. Additionally, since both surfaces of the transparent substrate 16 are flat, it is easier to attach the partition wall 24 compared to the lens array 22.

The partition wall 24 is of a planar shape forming a grid. The partition wall 24 surrounds each first lens 14 and specifically includes side surfaces 26 surrounding the respective first lenses 14. Each side surface 26 includes a pair of first side surfaces 26A facing the first direction D1 and a pair of second side surfaces 26B facing the second direction D2. The first direction D1 and the second direction D2 are perpendicular to each other. Between each first lens 14 and a corresponding one of the side surfaces 26, there is a space and part of the surface of the transparent substrate 16.

At least the surface (or material) of the partition wall 24 is black. At least the surface (or material) of the partition wall 24 is made of a light-absorbing material. The partition wall 24 blocks part of the divergent light, thereby reducing the spread of divergent light directed to each second lens 18. Specifically, circular spread is transformed into a rectangular spread, confining the divergent light within the rectangular planar shape of the second lens 18.

The following describes the propagation of light in the backlight 10. The divergent light emitted from the light source 12 has a light distribution angle of, for example, ±90 degrees. The divergent light enters one surface of the transparent substrate 16, and a portion of it exits through the first lenses 14. The divergence angle of the divergent light is reduced by the first lenses 14 to, for example, ±15 degrees. Another portion of the divergent light exits from the opposite surface of the transparent substrate 16. Since the front and rear surfaces of the transparent substrate 16 are flat and parallel, refractions during entry and exit cancels each other out, resulting in a light distribution angle of ±90 degrees for the light exiting the transparent substrate 16.

Figure 4:
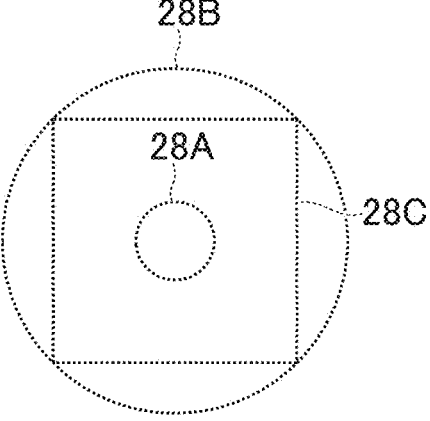
FIG. 4 is an explanatory diagram of a light illumination area of the backlight.

FIG. 4 is an explanatory diagram of the light illumination area of the backlight 10. In the backlight 10, the second lens 18 is of a planar shape forming a rectangle (FIG. 1) to achieve a surface light source. On the other hand, the illumination area 28A (FIG. 4) of the divergent light from the light source 12 is circular. As a result, above the first lenses 14 and the transparent substrate 16, an edge of the illumination area 28B (FIG. 4) directs toward the adjacent second lens 18, which is contiguous along the side 20 of the rectangle. If excessive light enters the adjacent second lens 18, collimated light cannot be achieved.

In this embodiment, the partition wall 24 blocks the edges of the illumination area 28B (FIG. 4) of the divergent light, transforming the circular illumination area 28B into a rectangular illumination area 28C (FIG. 4), thereby preventing the divergent light from entering adjacent second lenses 18. This enables the emission of collimated light. The height and thickness of the partition wall 24 is sed not to block the divergent light too much. For example, the height and thickness are calculated to block part of the divergent light emitted from the transparent substrate 16 outside each first lens 14 (e.g., light distribution angle of ±18 degrees or more), while the divergent light emitted from each first lens 14 (e.g., light distribution angle of ±15 degrees) is not blocked.

Figure 5:
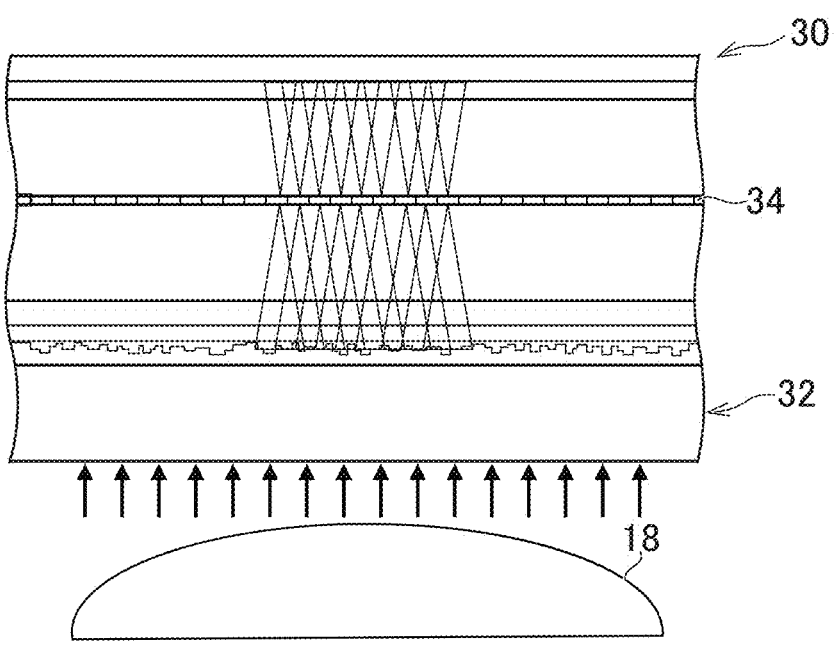
FIG. 5 is a schematic sectional view of a display device according to the embodiment.

FIG. 5 is a schematic cross-sectional view of a display device according to the embodiment. The display device includes the backlight, which includes the aforementioned second lenses 18, and a transmissive display panel 30. Light enters the display panel 30 from the second lenses 18. The light is white. That is, the light incident on the display panel 30 includes red, green, and blue light. Additionally, the light entering the display panel 30 is nearly collimated.

The display panel 30 includes a color separation unit 32. The surface of the substrate in the color separation unit 32 is provided with color separation grooves formed by a predetermined pattern of unevenness. These grooves diffract the white light, separating it into RGB wavelength components. The separated light further passes through a color filter 34. This process produces red, green, and blue light, enabling the display panel 30 to display full-color images utilizing the optical properties of liquid crystals.

Modification 1

Figure 6:
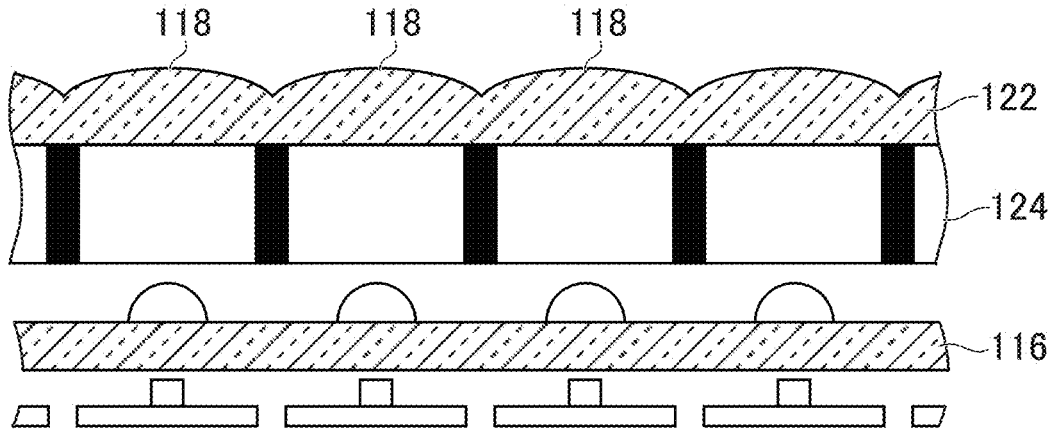
FIG. 6 is a sectional view of a backlight according to modification 1.

FIG. 6 is a cross-sectional view of a backlight according to Modification 1. There is a space between the partition wall 124 and the transparent substrate 116. The partition wall 124 is fixed to the lens array 122 (second lenses 118).

Modification 2

Figure 7:
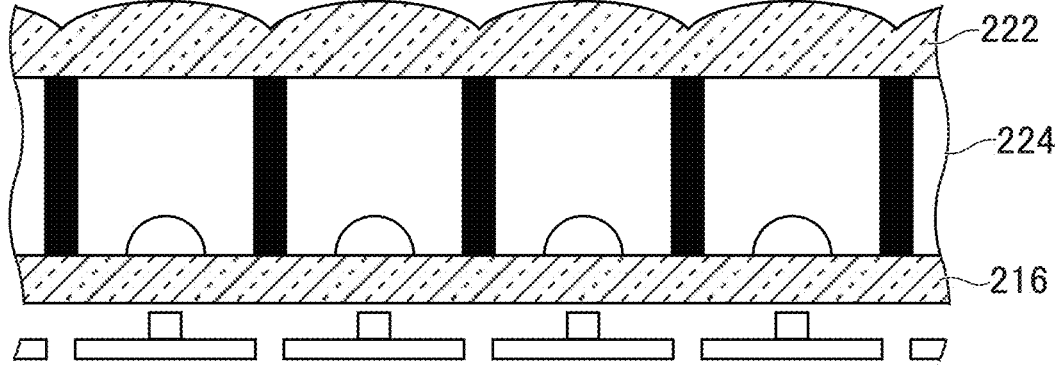
FIG. 7 is a sectional view of a backlight according to modification 2.

FIG. 7 is a cross-sectional view of a backlight according to Modification 2. The partition wall 224 is fixed to both the transparent substrate 216 and the lens array 222. There is no space between 224 and the transparent substrate 216, nor between the partition wall 224 and the lens array 222. The partition wall 224 functions as a spacer between the transparent substrate 216 and the lens array 222.

The embodiments described above are not limited and different variations are possible. The structures explained in the embodiments may be replaced with substantially the same structures and other structures that can achieve the same effect or the same objective.

Outline of the Embodiment

A backlight 10 including: light sources 12 planarly arranged and each capable of emitting divergent light; first lenses 14 planarly arranged, overlapping with the respective light sources 12 from above, and being of a shape enabling reduction of a divergence angle of the divergent light; second lenses 18 planarly arranged, overlapping with the first lenses 14 from above, and being of a shape enabling further reduction of the divergence angle; and a partition wall 24 located between the first lenses 14 and the second lenses 18, surrounding each of the first lenses 14, blocking part of the divergent light, and reducing an illumination area 28B of the divergent light directed toward each of the second lenses 18.

By blocking part of the divergent light and reducing the illumination area 28B of the divergent light, the divergent light no longer enters the adjacent second lenses 18, making it possible to irradiate collimated light.

What is claimed is:

1. A backlight comprising:
light sources planarly arranged and each capable of emitting divergent light;
first lenses planarly arranged, overlapping with the respective light sources from above, and being of a shape enabling reduction of a divergence angle of the divergent light;
second lenses planarly arranged, overlapping with the first lenses from above, and being of a shape enabling further reduction of the divergence angle; and
a partition wall located between the first lenses and the second lenses, surrounding each of the first lenses, blocking part of the divergent light, and reducing an illumination area of the divergent light directed toward each of the second lenses, wherein
each of the second lenses is of a planar shape forming a rectangle,
an adjacent pair of the second lenses are contiguous to each other at sides of the rectangle,
the second lenses are convex lenses that protrude toward sides opposite to the light sources,
the second lenses are integrated and constitute a lens array, and
a surface of the lens array facing the first lenses is flat.

2. The backlight according to claim 1, wherein
the first lenses are spaced apart from each other, and
the second lenses are contiguous to each other.

3. The backlight according to claim 1, wherein the illumination area directed to the corresponding one of the second lenses is rectangular and fits within a range of the planar shape forming the rectangle.

4. The backlight according to claim 1, wherein
each of the first lenses is of a planar shape forming a circle, and the illumination area directed to a corresponding one of the first lenses is circular.

5. The backlight according to claim 1, wherein the first lenses and the second lenses are spherical lenses.

6. The backlight according to claim 1, wherein the first lenses are convex lenses that protrude toward sides opposite to the light sources.

7. The backlight according to claim 1, further comprising a transparent substrate that supports the first lenses.

8. The backlight according to claim 7, wherein the partition wall is fixed to the transparent substrate.

9. The backlight according to claim 8, wherein there is a space between the partition wall and the lens array.

10. The backlight according to claim 7, wherein the partition wall is fixed to the lens array.

11. The backlight according to claim 10, wherein there is a space between the partition wall and the transparent substrate.

12. The backlight according to claim 7, wherein
the partition wall is fixed to both the transparent substrate and the lens array,
there is no space between the partition wall and the transparent substrate, and
there is no space between the partition wall and the lens array.

13. The backlight according to claim 1, wherein the partition wall is of a planar shape forming a grid.

14. The backlight according to claim 1, wherein the partition wall includes side surfaces surrounding the respective first lenses,
each of the side surfaces include a pair of first side surfaces facing a first direction and a pair of second side surfaces facing a second direction, and
the first direction and the second direction are perpendicular.

15. The backlight according to claim 1, wherein at least a surface of the partition wall is black.

16. The backlight according to claim 1, wherein at least a surface of the partition wall is made of a light-absorbing material.

17. A display device comprising:
the backlight according to claim 1, and
a transmissive display panel.

\* \* \* \* \*